US008117893B2

(12) United States Patent
Tinker et al.

(10) Patent No.: US 8,117,893 B2
(45) Date of Patent: Feb. 21, 2012

(54) HAMMER TEST BENCH

(75) Inventors: John Tinker, Middletown, PA (US); Steven Wright, Morgantown, PA (US)

(73) Assignee: Cleveland Brothers Equipment Co., Inc., Murrysville, PA (US)

( * ) Notice: Subject to any disclaimer, the term of this patent is extended or adjusted under 35 U.S.C. 154(b) by 372 days.

(21) Appl. No.: 12/549,710

(22) Filed: Aug. 28, 2009
(Under 37 CFR 1.47)

(65) Prior Publication Data

US 2010/0257917 A1 Oct. 14, 2010

Related U.S. Application Data

(60) Provisional application No. 61/190,449, filed on Aug. 28, 2008.

(51) Int. Cl.
*G01L 5/00* (2006.01)

(52) U.S. Cl. ...................................... 73/11.01; 73/12.01

(58) Field of Classification Search ................. 73/11.01, 73/12.01–12.14
See application file for complete search history.

(56) References Cited

U.S. PATENT DOCUMENTS

| | | | | |
|---|---|---|---|---|
| 1,576,465 | A | 3/1926 | Pryce | |
| 2,389,138 | A | 11/1945 | Cordiano et al. | |
| 4,235,094 | A | 11/1980 | Matochkin et al. | |
| 4,433,570 | A * | 2/1984 | Brown et al. | 73/12.04 |
| 4,862,746 | A * | 9/1989 | Komatsu | 73/572 |
| 4,901,587 | A | 2/1990 | Deremo et al. | |
| 5,277,055 | A | 1/1994 | Pittard et al. | |
| 5,487,299 | A * | 1/1996 | Williamson et al. | 73/12.09 |
| 6,023,997 | A * | 2/2000 | Willis et al. | 81/25 |

* cited by examiner

*Primary Examiner* — Max Noori

(74) *Attorney, Agent, or Firm* — Alan G. Towner, Esq.; Pietragallo Gordon Alfano Bosick & Raspanti, LLP

(57) ABSTRACT

A test bench for testing a hammer and hammer tool comprising: a bench frame; a load cell assembly mounted on the bench frame for absorbing the impact delivered by the hammer; and a movable mounting deck for securing the hammer to the bench frame and for moving the hammer with the hammer tool into a test firing position against the load cell assembly and delivering an impact force against the load cell assembly. The load cell assembly comprises a pneumatic air bag assembly constructed to dissipate the impact force of the hammer. Other aspects include a load cell assembly for testing a hammer and hammer tool and a method for test firing a hammer tool. Hydraulic hammers generating forces between 200 ft-lb and 12,000 ft-lb can be adequately test fired.

17 Claims, 6 Drawing Sheets

HAMMER TEST BENCH

CROSS REFERENCE TO RELATED APPLICATION

This application claims priority to U.S. Provisional Application Ser. No. 61/190,449 filed Aug. 28, 2008, which is incorporated herein by reference.

FIELD OF THE INVENTION

This invention relates to a test bench for test firing industrial hammers, such as large industrial hammers and, in particular, to hydraulic hammers without the hammer being fired in actual field use.

BACKGROUND INFORMATION

Large industrial hammers are, for example, percussion tools or impact vibrators and include pneumatic hammers, which are powered by compressed air, and hydraulic hammers, which are powered by a liquid.

Pneumatic hammers tend to be of smaller size and striking force than hydraulic hammers. An example of a typical pneumatic hammer is a jack hammer which is hand-held while in use, is approximately two to three feet in length and may weigh up to approximately 60 pounds. A jack hammer may deliver between approximately 900 to 1,600 blows per minute and the force of the blow is approximately 45 to 100 ft. lb. per blow.

Hydraulic hammers, by contrast, come in a variety of sizes and are usually much larger than a typical pneumatic hammer. Hydraulic hammers are often used as accessory units or attachments for construction machinery, such as excavators, loaders or other basic equipment for purposes of breaking or crushing rock, concrete or some other relatively hard material. A small hydraulic hammer may weigh approximately 265 pounds and deliver approximately 1,000 to 1,500 blows per minute with the force per blow being approximately 162 ft. lb. or 200 Joules. A very large hydraulic hammer can weigh approximately 16,000 pounds and deliver approximately 500 blows per minute with the force per blow being approximately 9,500 ft. lb. or 13,000 Joules.

Industrial hammers are generally driven by a percussion piston which moves inside a housing and alternately performs an operating stroke in a hammering direction and a return stroke in the opposite direction. During operation, the kinetic energy of the percussion piston when it strikes a tool is introduced via the tool and the tool tip into the material to be processed and the kinetic energy is converted into destructive actions. Depending on the hardness of the material to be processed, only a portion of the kinetic energy is converted to destructive action. The remaining, non-converted energy is reflected via the tool back into the percussion piston. Thus, percussion tools represent highly stressed devices that typically need frequent servicing.

Prior art testing devices have been directed towards test benches for hand operated pneumatic hammers. However, these test benches by virtue of their scale of size and component design generally are not suitable for testing the larger industrial hammers and, in particular, hydraulic hammers because of the massive size and force generated by hydraulic hammers in comparison to hand held pneumatic hammers. Most notably, these prior art devices employ an impact dissipating device that is insufficient to withstand the impact force of a large hammer and if used with a large industrial hammer the impact of the blow would not only cause the dissipating device to fail within a few blows but would also reflect the impact energy backwards through the frame of the test bench and the hammer securing mechanism so as to cause failure of the apparatus.

Examples of such prior art testing devices include, for example, U.S. Pat. No. 4,235,094 which discloses a vibration safety test bench for hand held riveting hammers wherein the riveting hammer is secured in a vertical position and the hammer is fired against a dummy work rigidly secured to the test bed and most preferably comprised of a duralumin plate. Similarly, U.S. Pat. No. 2,389,138 discloses a pneumatic hammer testing machine wherein the cutter piece of a pneumatic chipping hammer is held in place against a slab or plate of material by a pulley and weight mechanism. U.S. Pat. No. 1,576,465 discloses yet another test bench for a pneumatic rock hammer wherein the tool end of the drill is held against a testing block resiliently supported by a number of rubber blocks by a means exerting a constant force, such as a weight hanging from a chain.

Other prior art testing devices employ fluid-containing dissipating devices to receive the impact of the tool. For example, U.S. Pat. No. 4,901,587 discloses a test fixture for an air feed drill and U.S. Pat. No. 5,277,055 discloses a test stand for a hand held impact or impact-rotary tool, both of which impact the tool against a hydraulic pressurized cylinder. However, fluid-containing dissipating devices are not well suited for the repetitive and strong impact force of large industrial hammers because fluid rebounds relatively slowly and also would develop friction which would cause the unit to become hot and possibly fail.

Hydraulic hammers cannot be "dry fired" or test fired without impact against a resisting surface without causing damage to the mechanism. For this reason, it has not been possible to test fire a hydraulic hammer after servicing the unit without returning it to the field for actual in-service testing. Thus, there is a substantial need for a test bench which can accommodate the size and operating force of large industrial hammers so as to determine under test conditions whether the hammer is functioning properly.

SUMMARY OF THE INVENTION

The present invention provides a hammer test bench and a method for testing large industrial hammers and, in particular, hydraulic hammers which may be of massive size and operating force. In accordance with an embodiment of the present invention, there is provided a test bench with a movable mounting deck assembly for securing a large industrial hammer on the test bench and mechanically moving and securely holding the hammer into a firing position with the tool of the hammer against a load cell assembly, which is capable of dissipating the repetitive impact force of the hammer upon test firing. The load cell assembly is comprised of an impact receptor mounted to a pneumatic air bag assembly secured within a support carriage which allows the pneumatic air bag assembly to contract upon impact of the hammer tool on the impact receptor and then rebound to expand to its original configuration to dissipate the impact force of the hammer. The pneumatic air bag assembly is equipped with a gauge regulator assembly that allows the air pressure within the air bag assembly to be adjusted to accommodate the size of the hammer being tested and with pressure relief valves that protect the air bag assembly from being over inflated. The support carriage allows the pneumatic air bag assembly to contract and expand but holds the air bag assembly in a linear position so as to keep the impact receptor aligned with the hammer tool to preserve the structural integrity of the pneumatic air bag assembly. The height of the load cell assembly may be adjusted by raising or lowering the support carriage to align the hammer tool with the center of the impact receptor. The energy needed for movement of the mounting deck assembly and the energy needed for the firing of the hammer are generally supplied separately by a power unit which can be operated by remote control.

An aspect of the present invention provides a test bench for testing a hammer and a hammer tool, comprising: a bench frame; a load cell assembly mounted on the bench frame for absorbing the impact force delivered by the hammer; and a movable mounting deck for securing the hammer to the bench frame and for moving the hammer and hammer tool into a test firing position against the load cell assembly for delivering an impact force against the load cell assembly; the load cell assembly comprising a pneumatic air bag assembly constructed to dissipate the impact force of the hammer.

Another aspect of the present invention provides a load cell assembly for testing a hammer and a hammer tool, comprising: an impact receptor for receiving the hammer tool of the hammer during testing and for absorbing the impact force delivered by the hammer tool against the impact receptor; a pneumatic air bag assembly connected to the impact receptor and constructed to dissipate the impact force; and a support carriage for securing the pneumatic air bag assembly to the load cell assembly and for holding the pneumatic air bag assembly in a position for maintaining the impact receptor in alignment with the hammer tool.

A further aspect of the present invention provides a method of test firing a hammer and a hammer tool, comprising: providing a load cell assembly comprising a pneumatic air bag assembly constructed to dissipate the impact force delivered by the hammer tool and to expand to its original configuration after each test firing cycle of the hammer; and reciprocating the hammer into a test firing position with the hammer tool of the hammer impacting against the load cell assembly to absorb the impact force delivered by the hammer and to contract the pneumatic air bag assembly, and with the hammer moving away from the load cell assembly to allow the pneumatic air bag assembly to expand to its original configuration after each test firing cycle of the hammer These and other aspects of the present invention will be more apparent from the following description.

DETAILED DESCRIPTION

Figure 1:
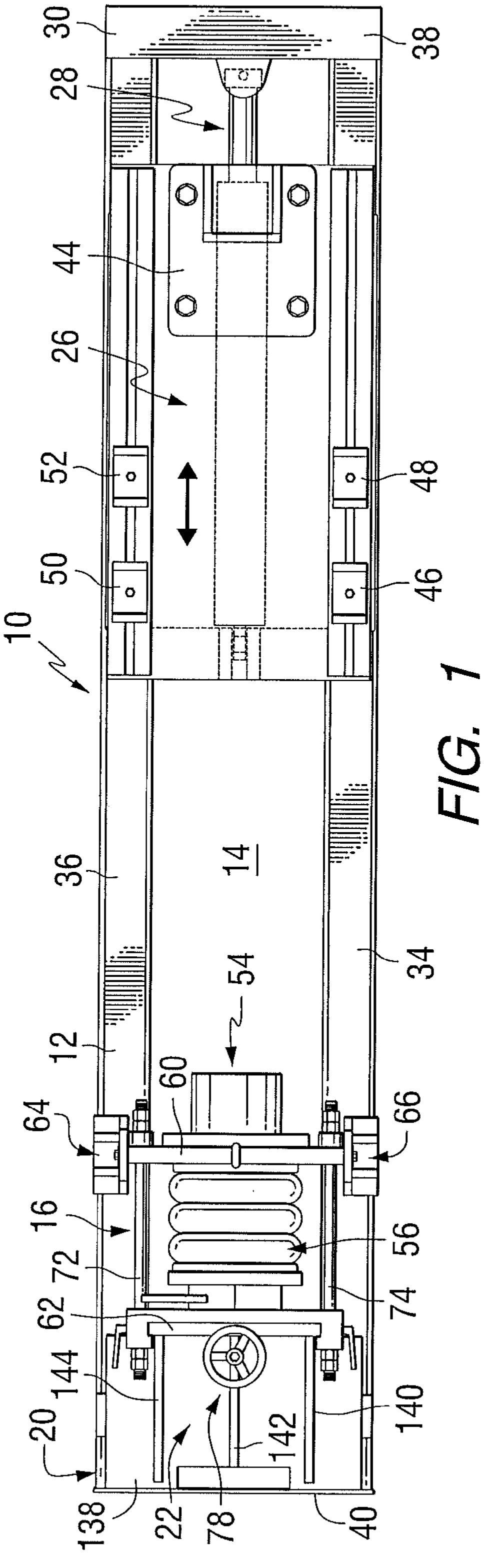
FIG. 1 is a plan view of a hammer test bench of the present invention.
Figure 2:
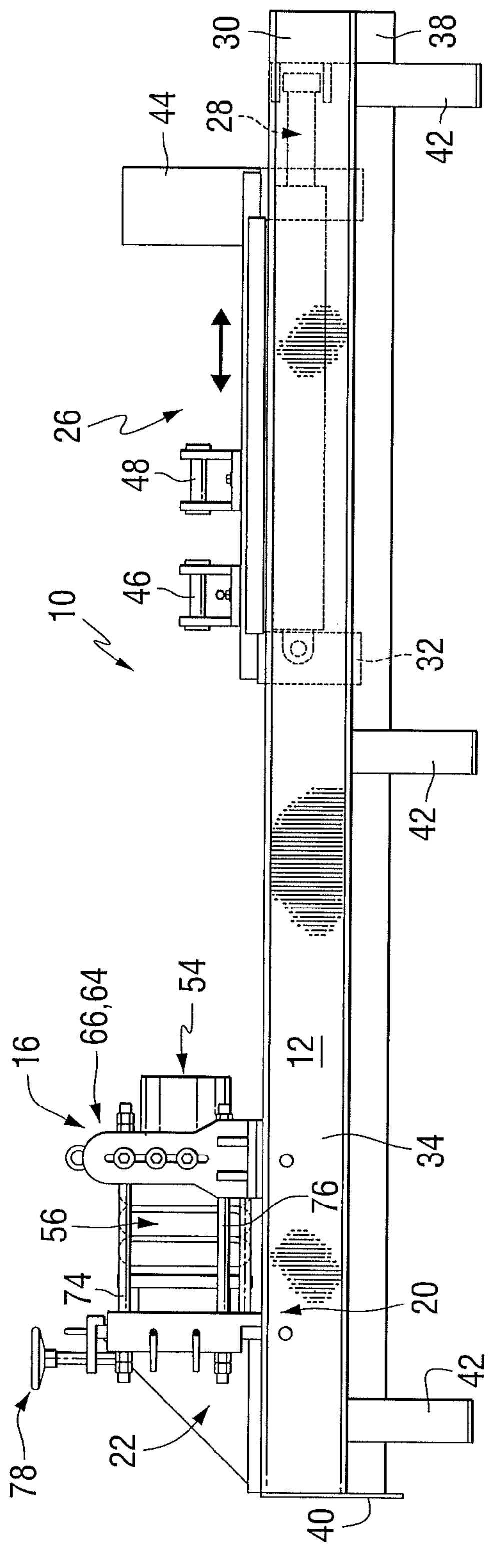
FIG. 2 is a side elevation view of the hammer test bench of FIG. 1.

Referring first to FIGS. 1 and 2, there is illustrated, in general, a hammer test bench 10 for test firing large industrial hammers, and in particular, hydraulic hammers without the hammer being fired in actual field use. Hammer test bench 10 comprises a bench frame 12 with an open center 14 (FIG. 1), a load cell assembly 16 attached to the rear end 20 of bench frame 12 by a tailstock 22 which is fixedly mounted on the bench frame 12; and a mounting deck assembly 26 which positions the hammer and hammer tool for making contact with the load cell assembly 16 by operation of a hydraulic positioning cylinder assembly 28 located within mounting deck assembly 26 as shown in FIG. 2. Mounting deck assembly 26 secures a hammer to be tested. As better shown in FIG. 2, hydraulic positioning cylinder assembly 28 is attached to the fore end 30 of bench frame 12 and to the rear end 32 of mounting deck assembly 26 for reciprocating mounting deck assembly 26 toward and away from load cell assembly 16 for testing of the hammer.

Still referring to FIGS. 1 and 2, bench frame 12 is constructed of materials suitable for supporting the weight of the other components of the hammer test bench 10 and the weight of the hammer (not shown) being tested, the total weight of which can range up to approximately 20,000 pounds. In a non-limiting embodiment of the present invention, and as better shown in FIG. 2, bench frame 12 is comprised of an open bench top comprised of two opposed side frames 34 and 36, and two opposed end frames 38 and 40. Side frames 34 and 36 and end frames 38 and 40 may be comprised of rectangular steel tubing which may be welded together to form bench frame 12, and which bench frame 12, in turn, is supported by a plurality of bench legs 42, three of which are clearly shown in FIG. 2. Bench legs 42 may also be comprised of rectangular steel tubing and are attached, for example, by welding, to side frame 34. Even though three bench legs 42 are shown in FIG. 2, it is to be appreciated that an additional three bench legs 42 are provided on the opposite side of bench frame 12 and are attached, for example, by welding, to side frame 36 of bench frame 12. As clearly shown in FIG. 1, mounting deck assembly 26 further comprises a headstock 44 for bracing a hammer (not shown) to be test fired, and ratchets 46 and 48 which cooperate with opposed ratchets 50 and 52. Ratchets 46, 48, 50 and 52 receive straps (not shown) which are wrapped around the hammer for tightening and securing the hammer to be test fired to mounting deck assembly 26.

Figure 3:
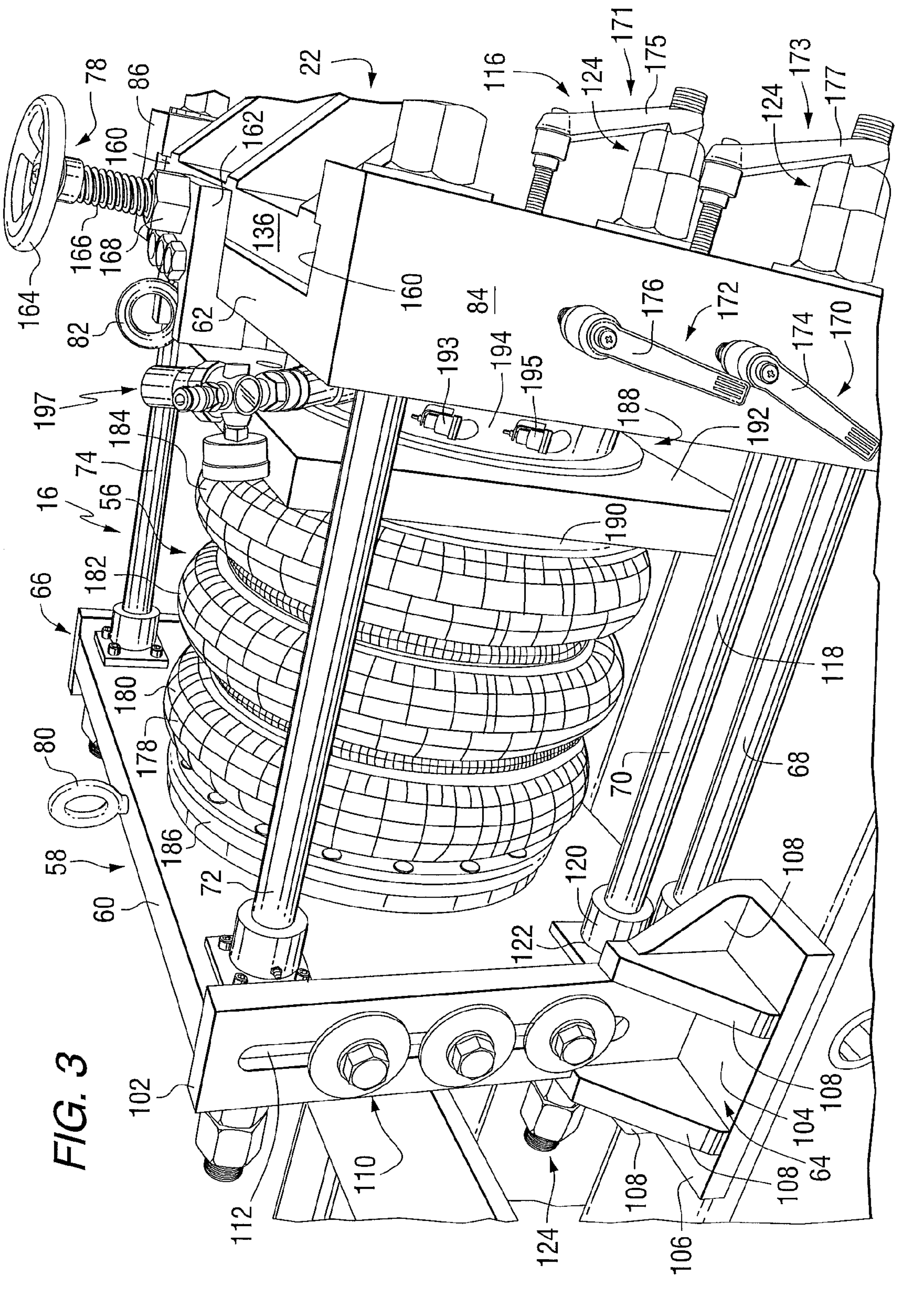
FIG. 3 is an enlarged perspective right side view of a load cell assembly mounted on the hammer test bench of FIG. 1.
Figure 4:
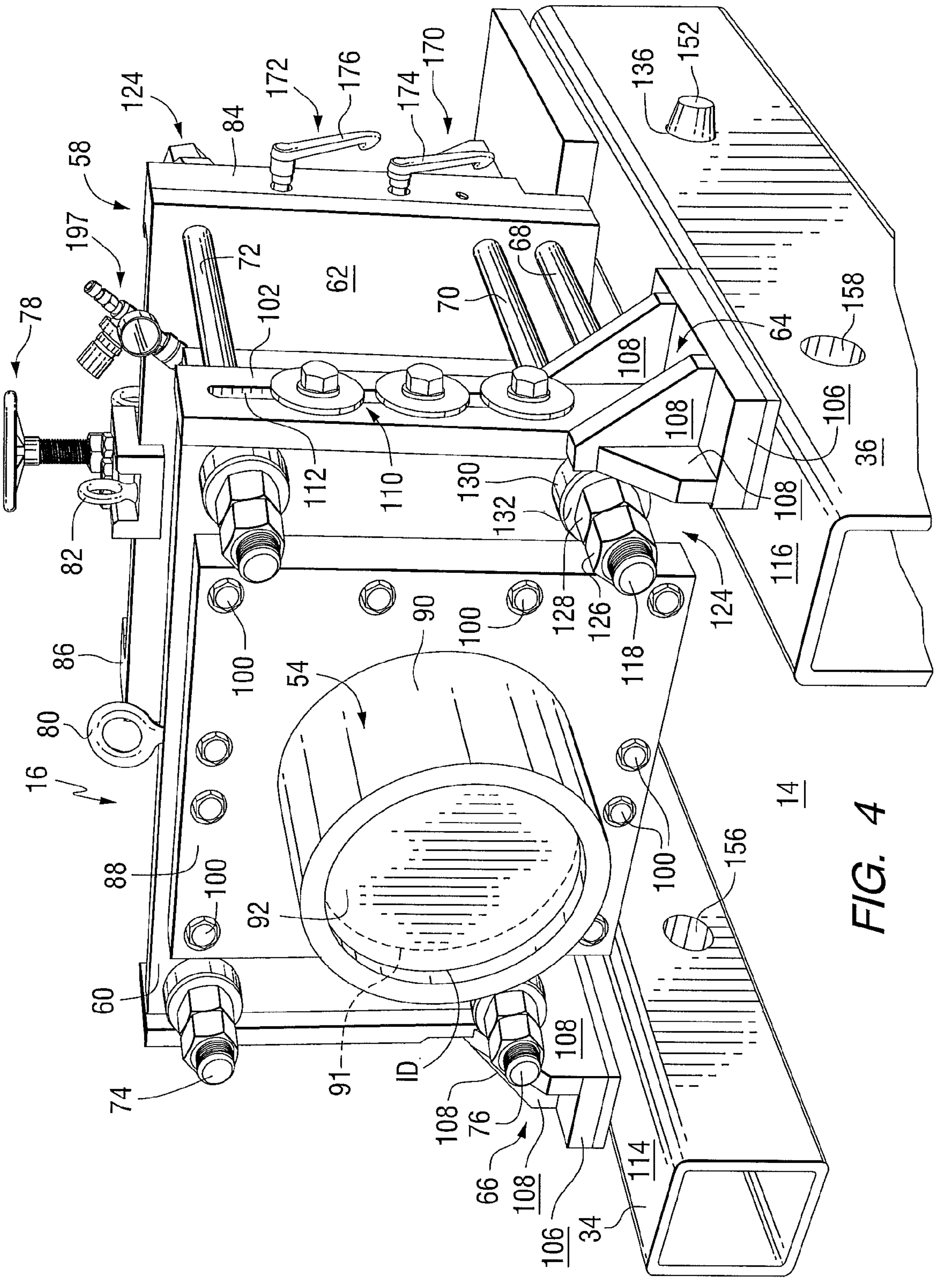
FIG. 4 is an enlarged perspective front view of the load cell assembly of FIG. 3.

FIGS. 3 and 4 more clearly illustrate the load cell assembly 16 which receives the hammer tool of the hammer to be test fired. FIG. 3 shows an enlarged perspective right side view of the load cell assembly 16 and FIG. 4 shows an enlarged perspective front view of load cell assembly 16. Load cell assembly 16 comprises an impact receptor 54 (FIG. 4) mounted to a pneumatic air bag assembly 56 (FIG. 3) which is secured within a support carriage assembly 58. Support carriage assembly 58 comprises spaced-apart front carriage plate 60 and rear carriage plate 62; a first front supporting foot assembly 64 and a second front supporting foot assembly 66 as better shown in FIG. 4; a plurality of supporting guide rod assemblies, some of which are indicated in FIGS. 3 and 4 by reference numerals 68, 70, 72, 74, and 76 for interconnecting carriage plates 60 and 62; a hand wheel adjustment assembly 78; a plurality of lifting eyelets, two of which are indicated in FIGS. 3 and 4 by reference numerals 80 and 82, and which lifting eyes 80 and 82 are attached at various locations on the top end surface of front carriage plate 60 and rear carriage plate 62; and a first rear supporting assembly 84 and a second rear supporting assembly 86 attached to rear carriage plate 62.

As shown in FIG. 3, front carriage plate 60 is located between the first front supporting foot assembly 64 and the second front supporting foot assembly 66, and rear carriage plate 62 is positioned between the first rear supporting assembly 84 and the second rear supporting assembly 86.

Referring particularly to FIG. 4, impact receptor 54 comprises a receptor base plate 88, a cylindrical impact receptacle 90 mounted on the receptor base plate 88, which houses a replaceable impact plate 92 and a rubber disc 91 (shown by the dotted lines), which is concealed from view by the replaceable impact plate 92. Rubber disc 91, which is housed in the cylindrical impact receptacle 90, is used generally for localized shock absorption purposes. The diameter of replaceable impact plate 92 is slightly less than the internal diameter ID of the impact receptacle 90 and is held in place by a close tolerance fit. Receptor base plate 88 is mounted to the external front side of the front carriage plate 60 as shown in FIG. 4 by a plurality of threaded screws, some of which are shown by reference numeral 100 positioned around the perimeter of receptor base plate 88. Impact plate 92 in some non-limiting embodiments, may be a disc shaped plate made of a hard metal material, such as, steel that the hammer tool is brought to bear against. This impact plate 92 rests in the bore of cylindrical impact receptor 90 to conceal the rubber disc 91, described herein above. In some instances, impact plate 92 and rubber disc 91 may be sacrificial in nature so as to prevent premature failure of one or more components of the load cell assembly 16.

Still referring to FIGS. 3 and 4, and as better shown in FIG. 3, front supporting foot assembly and rear supporting assembly 64 and 66 each comprises an adjustable vertical support arm 102, which, for example, may be welded to the top surface 104 of a horizontal foot base plate 106. Horizontal foot base plate 106 is reinforced with a plurality of triangular foot base gusset plates 108, which are for example welded to the sides of the adjustable vertical support arm 102 and to the top surface 104 of the horizontal foot base plate 106. Adjustable vertical support arm 102 is secured to the front carriage plate 60 by a plurality of bolt and nut fasteners, one of which is indicated by reference numeral 110 fitted through a center slot 112 in the support arm 102. The height of both front supporting foot assembly 64 and rear supporting foot assembly 66 relative to front carrier plate 60 can be adjusted by loosening the bolt and nut fasteners 110 and moving the vertical support arm 102 up or down in a vertical direction with reference to FIGS. 3 and 4.

As shown in FIGS. 3 and 4, foot base plate 106 of the first front supporting foot assembly 64 rests upon the top surface 114 of side frame 34; whereas, the foot base plate 106 of the second front supporting foot assembly 66 rests upon the top surface 116 of side frame 36. The foot base plate 106 of foot assembly 64 and the foot base plate 106 of foot assembly 66 are slideable along their respective top surfaces 114, 116 of side frames 34, 36 towards and away from rear carriage plate 62 of support carriage assembly 58 for adjustment of load cell assembly 16 relative to side frame 34 and 36. It is to be appreciated that the bottom surface of each foot base plate 106 of each supporting foot assembly 64, 66 will comprise a frictionless surface. In a non-limiting embodiment, the foot base plate 106 may be coated with a smooth, plastic coating to facilitate movement along the top surface 114, 116 of side frames 34, 36.

Still referring to FIGS. 3 and 4, front carriage plate 60 is connected to rear carriage plate 62 by a plurality of guide rod assemblies, such as those shown at reference numerals 68, 70, 72, 74 and 76. Each guide rod assembly 68, 70, 72, 74 and 76, as particularly indicated for guide rod assembly 70 in FIG. 4, comprises a support guide rod 118 which passes through a bushing 120 (FIG. 3) on an internal side of front carriage plate 60 and through an aperture 122 in front carriage plate 60. Even though not shown in FIG. 4, bushings similar to bushings 120 may be provided with respect to the guide rod assemblies and rear carriage plate 62. Each guide rod assemblies 68, 70, 72, 74 and 76 are secured to the external side (FIG. 4) of carriage plate 60 by a nut fastener 124 affixed to the threaded end of the support guide rod 118. Nut fastener 124 comprises at least two nuts 126, 128, a metal washer 130, for example steel, and a resilient washer ring 132 fixed to the threaded end of the support guide rod 118. Resilient washer ring 132 may be made of any suitable resilient material, for example, rubber, and has a substantial thickness for shock absorption purposes. It is to be appreciated that even though five guide rod assemblies are shown in the figures, that there are at least six guide rod assemblies. All guide rod assemblies are secured to rear carriage plate 62 by internal threads that fix each guide rod assembly to the rear carriage plate 62 in a rigid, non-permanent manner.

Figure 5:
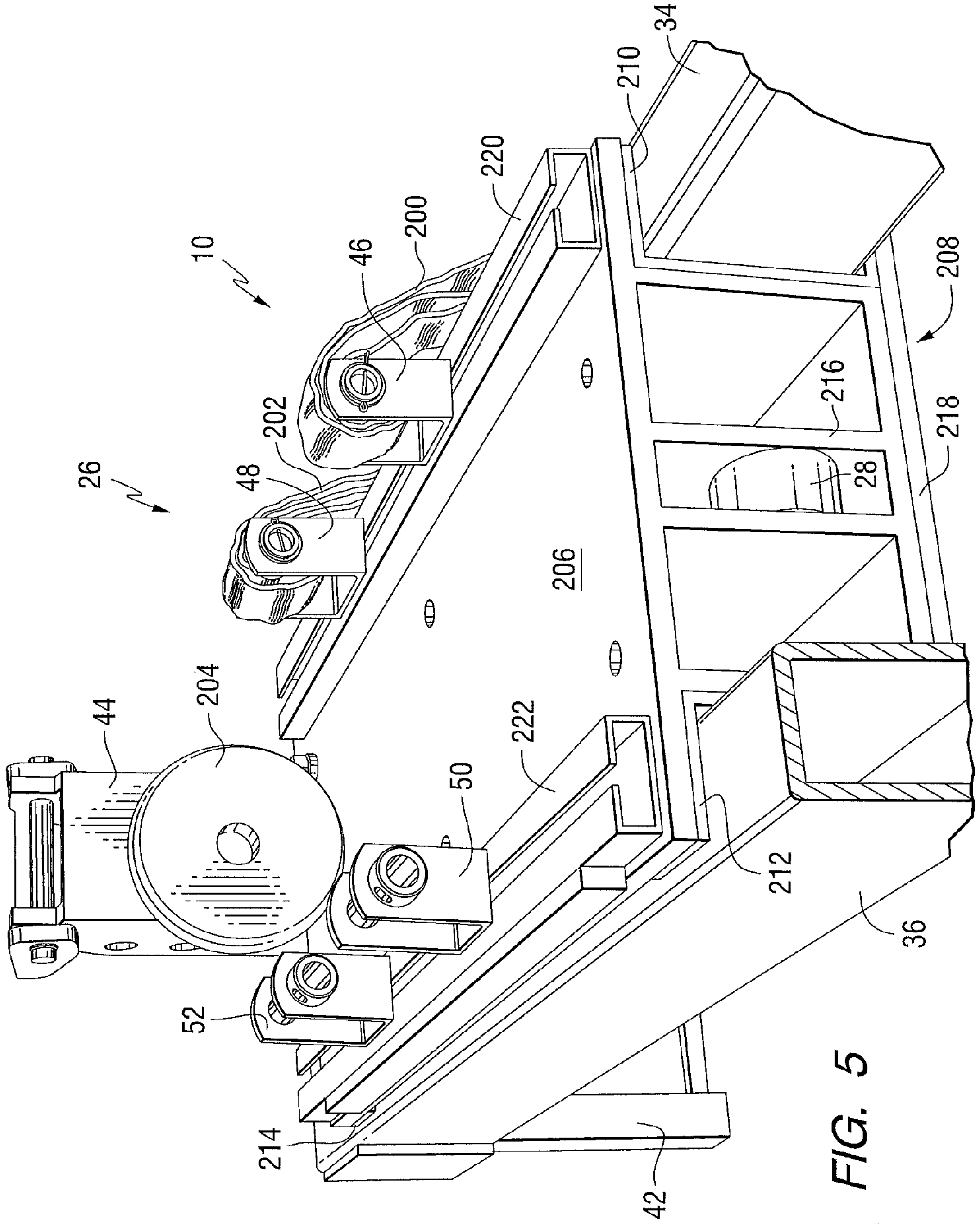
FIG. 5 is an enlarged perspective view of a mounting deck assembly of the hammer test bench of FIG. 1.
Figure 6:
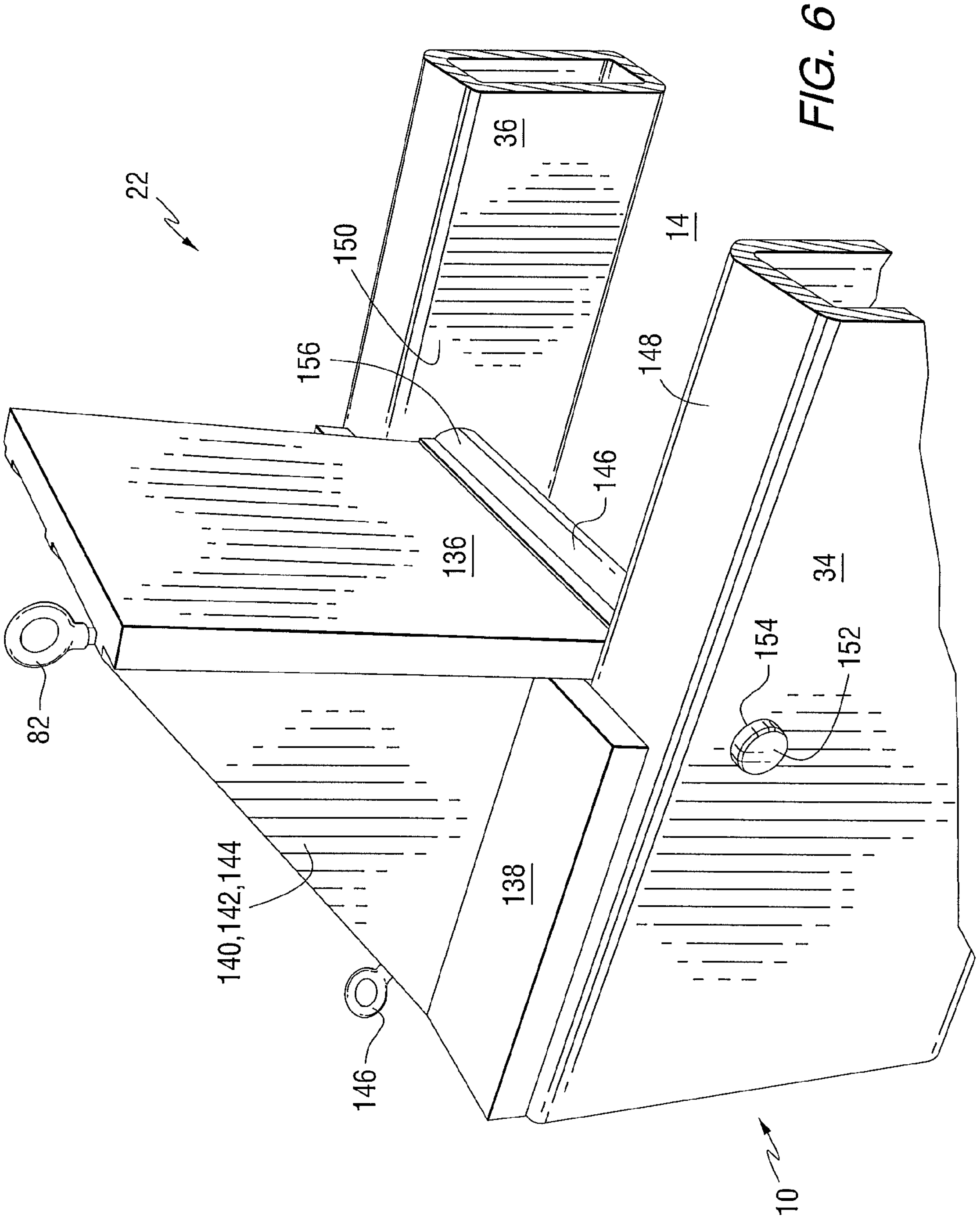
FIG. 6 is an enlarged perspective left side view of a tailstock for mounting the load cell assembly of FIG. 1.

FIG. 5 illustrates in detail the mounting deck assembly 26 for securing a hammer to be test fired and FIG. 6 illustrates in detail the tailstock 22 which secures the load cell assembly 16 to the top of hammer test bench 10 of FIGS. 1 and 2.

With particular reference to FIG. 6, tailstock 22 comprises a vertical face plate 136 attached to a horizontal base plate 138; a plurality of triangular gusset plates 140, 142 and 144 (FIG. 1) attached, for example, by welding, to the top surface of base plate 138 and to the back surface of face plate 136; a hollow tube 146 attached, for example, by welding, to the bottom surface of face plate 136; and a plurality of lifting eyelets 82 and 148. As discussed herein above, lifting eyelet 82 is attached, for example, by welding, to face plate 136. Lifting eyelet 148 as shown in FIG. 6 is attached, for example, by welding, to base plate 138. As shown in FIG. 6, the width of face plate 136 is less than the width of base plate 138 and the bottom section of face plate 136, and face plate 136 extends below base plate 138 to fit between the interior surfaces 148, 150 of side frames 34, 36 respectively, where face plate 136 is secured to test bench 10 by means of removable pin 152. Removable pin 152 passes through an aperture 154 which is bored in side frame 34, through the tailstock tube 146, and through an aperture 156, which is bored in side frame 36. Additional apertures such as those shown by reference numerals 156 and 158 in FIG. 4 may be provided along the length of side frames 34 and 36, respectively so that tailstock 22 can be secured along test bench 10 at different locations in order to accommodate the testing of different length hammers.

Referring again to FIG. 3, rear carriage plate 62 of the support carriage assembly 58 is affixed to and supported by tailstock 22 by the first and second rear supporting assemblies 84 and 86 which are an integral part of rear carriage plate 62. As shown in FIG. 3, supporting assemblies 84 and 86 have an internal notched section 160 which fits around the back side of face plate 136. Rear carriage plate 62 along with supporting assemblies 84 and 86 may be raised or lowered relative to face plate 136 of tailstock 22 by using the hand wheel adjustment assembly 78 mounted over the top surface of rear carriage plate 62. More particularly, hand wheel adjustment assembly 78 comprises an adjustment base plate 162, which extends over the top surface of rear carriage plate 62 and the top surface of face plate 136. A hand wheel 164 is attached to a threaded shaft 166 which passes through nut 168 mounted to the top surface of adjustment base plate 162 and through an aperture (not shown) in base plate 162 to rest against the top surface of face plate 136. As hand wheel 164 is rotated, shaft 166 pushes against the top surface of face plate 136 to raise rear carriage plate 62 away from the top surface of face plate 136. A lowering of rear carriage plate 62 is accomplished by a reverse action. Once a desired height is reached, rear carriage plate 62 along with supporting assemblies 84 and 86 may be affixed to face plate 136 by fixing bolt assemblies 170, 172, 171, and 173 which are equipped with handles 174, 176, 175 and 177 respectively that operate fixing bolt assemblies 170, 172, 171 and 173 which pass through apertures (not shown) in supporting assemblies 84 and 86 and engage face plate 136. Even though fixing bolt assemblies 170, 172, 171 and 173 are shown in FIG. 3 associated with supporting assembly 84, similar bolt assemblies may be provided for supporting assembly 86.

Referring again to FIGS. 3 and 4, the guide rod 118 of each supporting guide rod assembly 68, 70, 72, 74, and 76 extends through an aperture in rear carriage plate 62 and are secured to rear carriage plate 62 by a nut fastener 124 (better shown in FIG. 3) fixed to the threaded end of guide rod 118 similar to that described herein above for the nut assemblies 124 associated with front carriage plate 60. Similarly, nut fastener 124 associated with the guide rod 118 of each supporting guide rod assembly 68, 70, 72, 74 and 76 and rear carriage plate 62 comprises at least two nuts fixed to the thread end of the supporting guide rod 118, a metal washer, and a resilient washer which is provided for shock absorption purposes.

Referring particularly to FIG. 3, the pneumatic air bag assembly 56 comprises a rubber body 178 having a plurality of rubber volutes 180, 182 and 184, and which rubber body 178 is a cast one-piece construction. Pneumatic air bag assembly 56 is attached at its one end to the internal surface of front carriage plate 60 by a steel bead ring 186 and is attached at its other end to a rear bag support assembly 188 by a steel bead ring 190. The rear bag support assembly 188 comprises a base plate 192 attached, for example, by welding, to a cylindrical port station 194. A gauge regulator assembly 197 is attached to the cylindrical port station 194 and allows compressed air from shop air compressors (not shown) to fill and maintain pressure in the rubber body 178 during test firing of the hammer. Cylindrical port station 194 is also equipped with at least two pressure relief valves 193 and 195 to protect the pneumatic air bag assembly 56 from being over pressurized. Gauge regulator assembly 197 may be quickly attach to and disconnected from load cell assembly 16 via quick disconnect fittings, in a manner well known to those skilled in the art. Gauge regulator assembly 197 is set up to continually adjust air pressure such as to match the pressure in rubber body 178 to the size of the hammer which is being test fired. Larger hydraulic hammers in most instances, will required more pressure than smaller hammers. Two pressure relief valves 193 and 195 located in cylindrical port station 124 provide primary and redundant over-pressure protection for pneumatic airbag assembly 56. Each relief valve 193, 195 is designed to handle the volume of air in the pneumatic air bag assembly 178 and to limit the maximum pressure in rubber body 178 so as not to exceed the manufacturer's limitations for rubber body 178. Even though only one relief valve may be used for this latter purpose, a second relief valve is added as a back-up safety device.

A suitable pneumatic air bag assembly for use in the invention is available from Firestone Industrial Products Co., a Division of Firestone Tire and Rubber Company, Manufacturers Part Number W01-358-7761, known as Firestone Model Number 312C Air Spring Assembly. The maximum pressure allowable in this pneumatic air bag assembly is published by Firestone as being 100 PSI based on a two-ply construction of rubber body 178. The burst pressure of this pneumatic air bag assembly may be three times the published maximum pressure, that is, 300 PSI. Suitable pressure relief valves for the invention may be Part Number 159-SN-50-100 available from Watts and factory preset to 100 PSI. The inventors have found favorable performance of the pneumatic air bag assembly 56 when gauge regulator assembly 196 is adjusted between 25 and 60 PSI, depending on the size of the hammer being tested, the larger hammers requiring higher air pressures.

Figure 7:
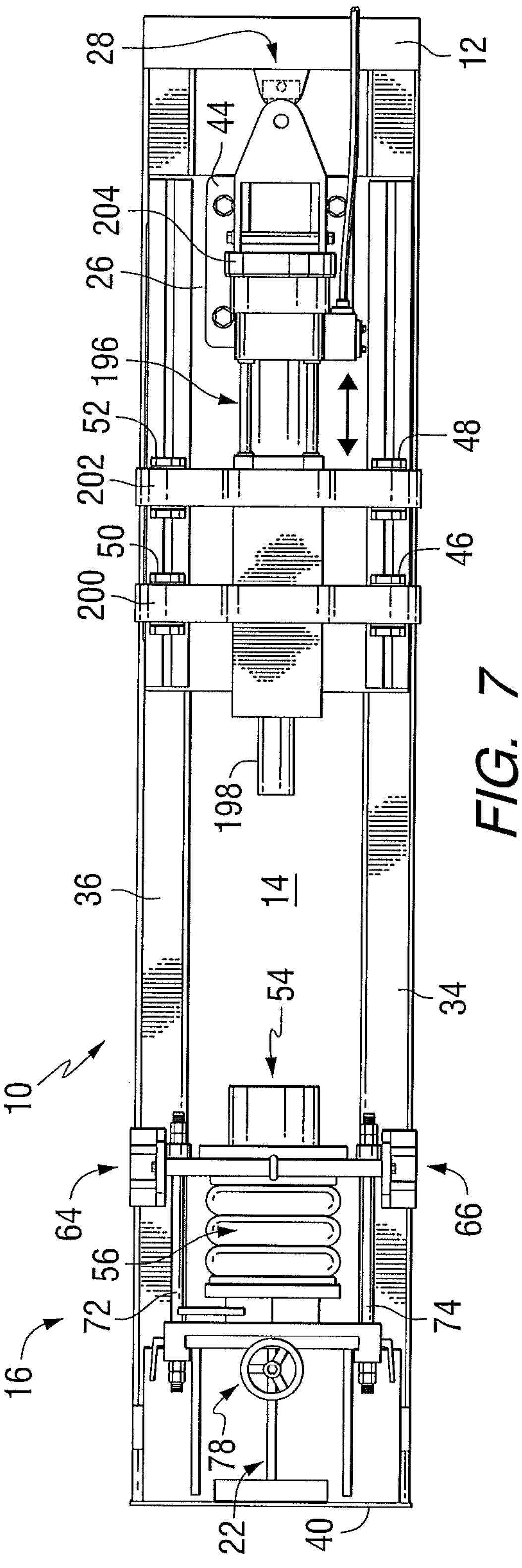
FIG. 7 is a plan view of a hammer test bench of the present invention supporting a hammer to be test fired.
Figure 8:
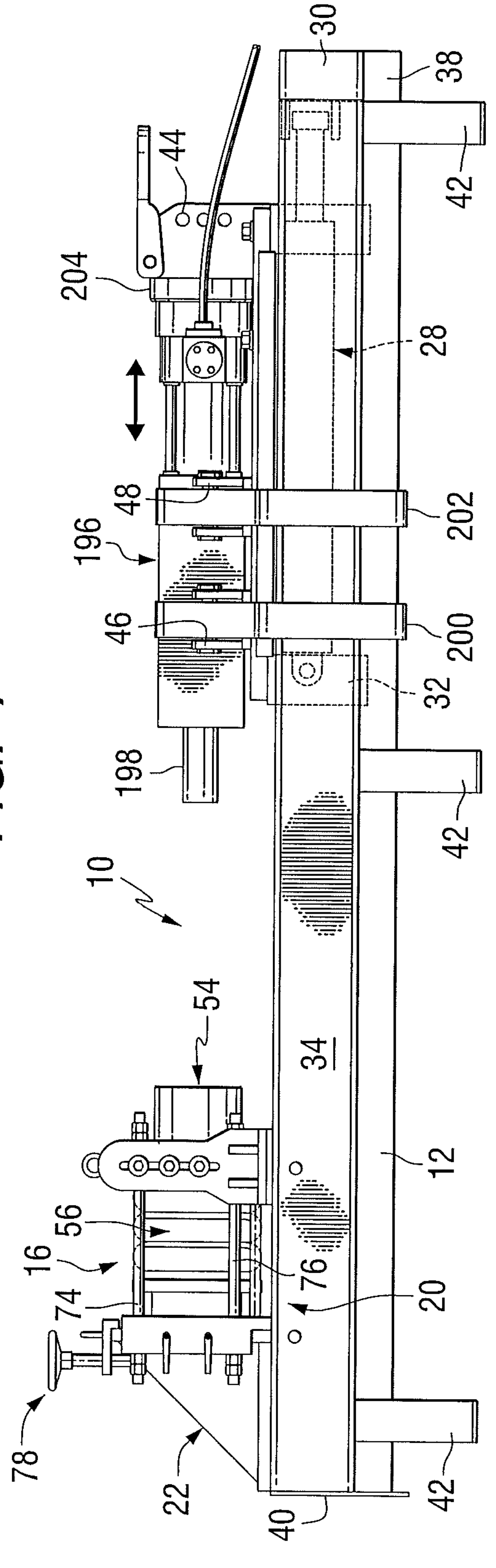
FIG. 8 is a side elevation view of the hammer test bench and the hammer of FIG. 7.

FIGS. 7 and 8 clearly illustrate a hammer 196 with hammer tool 198, which is to be test fired in test bench 10. Hammer 196 is positioned in mounting deck assembly 26, as more clearly shown in FIG. 5. With particular reference to FIG. 5, mounting deck assembly 26 in addition to head stock 44, ratchet assemblies 46, 48, 50 and 52 and positioning cylinder assembly 28, further comprises straps 200 and 202 secured to ratchet assemblies 46 and 48, respectively, buffer 204, upper deck plate 206 and lower assembly 208. Lower assembly 208 is a carriage structure made from steel plates, which in some non-limiting embodiments, are welded together and comprises a plurality of C-shaped members, one located at each of the four corners of top plate 206. Three such C-shaped members are indicated in FIG. 5 by reference numerals 210 212, and 214, but it is to be appreciated that a fourth C-shaped member is mounted to the upper left hand corner of top plate 206. Lower assembly 208 further comprises a central bracketed member 216 connected to the C-shaped members and a lower deck plate 218. Upper deck plate 206, the four C-shaped members, and central bracketed member 216 are structurally connected together, for example, by welding as shown in FIG. 5, with the lower deck plate 218, in some non-limiting embodiments, being connected to the bracketed member 216 by threaded fasteners (not shown). The bottom surface of each C-shaped member is frictionless, and in some embodiments, may be coated with a smooth plastic coating to facilitate reciprocation of mounting deck assembly 26 along the top surface of side frames 34 and 36 so that mounting deck assembly 26 may slidably move via positioning cylinder assembly 28 in the direction of the load cell assembly 16 to bring hammer tool 198 into contact with impact receptor 54 of load cell assembly 16 (FIGS. 7 and 8) for testing and to return mounting deck assembly 26 via positioning cylinder assembly 28 to its original positioning along test bench 10 after testing the hammer 196.

Still referring to FIG. 5, ratchet assemblies 46, 48, 50 and 52 are mounted to the top surface of upper deck plate 206 on each of the upper edges of upper deck plate 206 via elongated brackets 220 and 222 and are slidably adjustable along the length of brackets 220 and 222 in a manner well known to those skilled in the art in order to adjust ratchet assemblies 46, 48, 50 and 52 along mounting assembly 26 to accommodate the length and/or size of the hammer being tested. Suitable ratchet assemblies 46, 48, 50 and 52 and straps 46 and 48 may be those commercially available and operate in a manner well known to those skilled in the art. When a hammer to be tested is positioned within ratchet assemblies 46, 48, 50 and 52 on upper deck plate 206, straps 46 and 48 are brought across the hammer and are fastened and secured in their respective ratchet assembly 50 and 52.

With reference to FIGS. 5, 7 and 8, as will be appreciated, alignment blocks (not shown) may be used to position test hammer 196 on mounting deck assembly 26 and in alignment with load cell assembly 16. Head stock 44 bears the repelling force of the hammer 196 fire during the testing process. As more clearly shown in FIG. 5, buffer 204 which may be in a cylindrical configuration to coincide with the configuration of the hammer, in general may be provided between the headstock 44 and the hammer 196. Buffer 204 may be made of a resilient material, for example, rubber. Buffer 204 is generally provided to protect the several components of the system, especially the bolts used to secure the several components together throughout the mounting deck assembly 26 from shearing during the live fire testing of the hammer. FIGS. 7 and 8 show mounting deck assembly 26, headstock 44, buffer 204, ratchet assemblies 46, 48, 50 and 52, and straps 200, 202, and the manner in which mounting deck assembly 26 is captive within the test bench frame 12, yet slides to bring the hammer tool 198 into contact with the load cell assembly 16. It is to be further appreciated that FIGS. 7 and 8 do not contain all of the reference numerals of the other figures for simplicity sake.

Referring again to FIG. 4, pneumatic air bag assembly 56 is supported and mounted between front carriage plate 60 and rear carriage plate 62, which are supported by the guide rod assemblies shown at 68, 70, 72, 74 and 76, and the first front supporting foot assembly 64 and the second front supporting foot assembly 66. Each of the guide rods of the guide rod assemblies 68, 70, 72, 74 and 76 are supported by bushings 120 (FIG. 3). Supporting foot assemblies 64 and 66 are adjustable up and down in a vertical direction relative to FIG. 3. The impact point of the hammer tool (not shown) requires that it be centered into the impact receptor 54 (FIG. 4). Supporting foot assemblies 64 and 66 can then be adjusted in a vertical direction relative to impact receptor 54 (FIG. 4) in accordance to the overall dimensions of the hammer to be tested. Supporting foot assemblies 64 and 66 are also necessary to support the weight of the front end of load cell assembly 16 so as to maintain the alignment of the support rods of supporting guide rod assemblies 68, 70, 72, 74 and 76 While proper setting of supporting foot assemblies 64 and 66 holds the front carriage plate 60 in alignment with the tool of the hammer to be tested, handles 172, 174, 175 and 177 allow fixing their respective screws (FIGS. 3 and 4) to hold the load cell assembly 16 in place on the tailstock 22. Hand wheel assembly 78 via hand wheel 164 and threaded shaft 166 allows for fine adjustment of the load cell assembly 16 relative to the centering of the hammer tool. Front carriage plate 60 and the remaining components of the load cell assembly 16 must be kept closely in alignment with the hammer tool to be tested in order to avoid any misalignment stresses on the guide rods 118 of guide rod assemblies 68, 70, 72, 74 and 76 and bushings 120. When being tested, the impact of the hammer tool will in effect compress the rubber body 178, which acts as a spring and rebounds to meet the next blow of the hammer tool 198. If a 312C air spring assembly from Firestone, as discussed herein above, is used, it generally will have a minimum compressed length of 4.5 inches overall, a maximum extended length of 14.75 inches overall, with an optimum design length of 13.0 inches overall. This particular air spring assembly gives a net compression range of 8.5 inches. Some hammers may have a maximum tool stroke length of approximately 6.0 inches. In practice, it has been found by the inventors that the length of travel of the hammer tool averages between 2.0 inches and 5.0 inches. As for the air pressure in the pneumatic air bag assembly 56 of the invention, gauge regulator assembly 196 maintains a relatively constant setting in rubber body 178 throughout the test session. It is to be appreciated that the tailstock 22 and the load cell assembly 16 supported by tailstock 22 can be positioned relative to each other and relative to the test bench 10 by using the several eyelets 80, 82, and engaging the several eyelets 80, 82 with a hoisting device provided in the testing area.

Referring particularly to FIG. 4 the center of impact plate 92 of load cell assembly 16 is impacted by the tool bit of the hammer that is test fired. As explained herein above, the load cell assembly 16 via the pneumatic air bag assembly 56 dissipates the energy from the blow of the hammer and rebounds before the next blow from the hammer is given. The rate of blows is also referred to as cycles and the energy dissipated is measured in ft. lbs. or joules. As stated herein above, in an embodiment of the present invention, bench frame 10 is constructed of materials and components suitable for supporting up to approximately 20,000 pounds. In an embodiment of the invention, test bench 10 may be capable of operating between 350 cycles and 520 cycles, and the energy dissipated may range from about 200 ft.-lb (271 joules) to about 12,000 ft.-lb. (16,269 joules).

The energy needed for movement of positioning cylinder assembly 28 (attached to the mounting deck assembly 26) toward and away from load cell assembly 16 and the energy needed for the firing of the hammer are supplied by a hydraulic power unit (not shown). In this example, this power unit is an arrangement comprised of an electric motor, a hydraulic pump, a reservoir containing hydraulic oil, and a control valve assembly. The control valve assembly of this arrangement responds to electrical inputs from the operator via a remote control pendant attached to a control cable. While this remote control pendant is generally hard wired to the power unit, one could integrate another control version that works on a radio frequency (RF-wireless) technology. This power unit provides the hydraulic energy necessary to position the mounting deck 26 and the supported impact hammer during testing and also provides the power (hydraulic pressure and flow) to the hydraulic hammer being tested.

In a non-limiting embodiment of the invention, this power unit (not shown) of test bench 10 described in the preceding paragraph may produce a hydraulic oil flow of approximately 23 GPM at pressures up to 2500 PSI from a variable displacement piston pump coupled to a 25 horsepower electric motor. The hydraulic oil flow is controlled by a valve package that allows the operator of the test bench 10 to simultaneously fire the hammer and adjust the positioning of the mounting deck assembly 26 to maintain contact of the hammer tool 198 and the impact receptor 54 of the load cell assembly 16. The maximum pressure supplied to the hammer may be controlled by the operator at a panel (not shown) on the front of the power unit (not shown) which features two pressure gauges, which receive pressure from two pressure circuits. That is, two hoses (for one reversible circuit) for delivering pressurized oil generally will be provided and attached to the hammer to be tested and two hoses (one reversible circuit) for delivering pressurized oil will be provided and attached to the positioning cylinder assembly 28 attached to the mounting deck assembly 26. The pressurized oil for the test hammer and the pressurized oil for the mounting deck assembly 26 will be provided from a single pressure source that is controllable as two separate reversible circuits.

Hammer test bench 10 of the present invention allows live fire testing of the repairs that were made to the hammer before the hammer is returned for field operations. This testing is performed to correct any operational and/or leakage problems that may be associated with the hammer. As can be appreciated from the above, mounting deck assembly 26 secures hammer 196 and reciprocates hammer 196 into a test firing position via hydraulic positioning cylinder assembly 28 and against load cell assembly 16, which absorbs the impact force delivered by hammer tool 198 against the impact receptor 90. Load cell assembly 16, along with the pneumatic air bag assembly 56, via support carriage 58 is maintained in a linear position in alignment with impact receptor 90. Gauge regulator assembly 197 adjusts the air pressure in the pneumatic air bag assembly 56 according to the size of the hammer being tested; while one or more pressure relief valves 193, 195 prevent over-inflation of the pressure in the pneumatic air bag assembly 56. Pneumatic air bag assembly 56 is constructed to dissipate the impact force delivered by the hammer tool 198 by contracting when the hammer tool 198 hits against replaceable impact plate 92 and impact receptor 90, and by expanding to its original configuration after each cycle of the test firing of hammer 196 and into a non-firing position when hammer 196 is moved away from load cell assembly 16. In dissipating the impact force delivered by hammer tool 198, a sufficient amount of compressed air is assured within the expandable pneumatic air bag assembly 56, by and with pressure regulator 197 maintaining the air pressure in the pneumatic air bag assembly 56 while at the same time replacing the air that may have escaped over the two pressure relief valves 193, 195 during the compression of the pneumatic air bag assembly 56.

Whereas particular embodiments of this invention have been described above for purposes of illustration, it will be evident to those skilled in the art that numerous variations of the details of the present invention may be made without departing from the invention as defined in the appended claims.

What is claimed is:

1. A test bench for testing a hammer and a hammer tool, comprising:
- a bench frame;
- a load cell assembly mounted on the bench frame for absorbing the impact force delivered by the hammer; and
- a movable mounting deck for securing the hammer to the bench frame and for moving the hammer and hammer tool into a test firing position against the load cell assembly and delivering an impact force against the load cell assembly;
- the load cell assembly comprising a pneumatic air bag assembly constructed to dissipate the impact force of the hammer.

2. The test bench of claim 1, wherein the load cell assembly further comprises:
- an impact receptor; and
- a support carriage for securing the pneumatic air bag assembly to the load cell assembly and for holding the pneumatic air bag assembly in a position for maintaining the impact receptor in alignment with the hammer tool.

3. The test bench of claim 2 wherein the support carriage comprises:
- a front carriage plate;
- a rear carriage plate; and
- a plurality of guide rod assemblies for interconnecting the front carriage plate and the rear carriage plate.

4. The test bench of claim 2 wherein the test bench further comprises a tailstock and wherein the support carriage is secured to the test bench via the tailstock and further comprising a hand wheel adjustment assembly for adjusting the support carriage relative to the tailstock.

5. The test bench of claim 2, wherein the load cell assembly further comprises:
- a gauge regulator assembly for adjusting and maintaining the air pressure in the pneumatic air bag assembly for the testing of the hammer;
- a tailstock for supporting the load cell assembly; and
- at least one pressure relief valve for preventing over-inflation of the pneumatic air bag assembly.

6. The test bench of claim 2 wherein the impact receptor of the load cell assembly further comprises:
- a receptor base plate;
- a cylindrical impact receptacle mounted on the receptor base plate; and
- a replaceable impact plate and a rubber disc housed in the cylindrical impact receptacle.

7. The test bench of claim 6 wherein at least the rubber disc is constructed to absorb shock and wherein at least the replaceable impact plate is constructed to fit within the cylindrical impact receptacle by a close tolerance fit.

8. The test bench of claim 1 wherein the mounting deck assembly comprises:
- an upper deck plate supported by the bench frame and movable along the bench frame for moving the hammer tool into contact with the load cell assembly;
- a plurality of ratchet and strap assemblies mounted on the upper deck plate for securing the hammer to the mounting deck assembly;
- a headstock;
- a lower assembly supporting the upper deck plate; and
- a hydraulic positioning cylinder assembly for reciprocating the mounting deck assembly within the bench frame for testing the hammer.

9. The test bench of claim 1 wherein the load cell assembly is capable of testing a hammer tool at an impact force ranging from about 200 ft.lb. to about 12,000 ft.lb.

10. A load cell assembly for testing a hammer and a hammer tool, comprising:
- an impact receptor for receiving the hammer tool of the hammer during testing and for absorbing the impact force delivered by the hammer tool against the impact receptor;
- a pneumatic air bag assembly connected to the impact receptor and constructed to dissipate the impact force; and
- a support carriage for securing the pneumatic air bag assembly to the load cell assembly and for holding the pneumatic air bag assembly in a position for maintaining the impact receptor in alignment with the hammer tool.

11. The load cell assembly of claim 10, further comprising:
- a gauge regulator assembly for adjusting and maintaining the air pressure in the pneumatic air bag assembly for testing of the hammer; and
- at least one pressure relief valve for preventing over-inflation of the pneumatic air bag assembly.

12. The load cell assembly of claim 10 wherein the impact receptor of the load cell assembly further comprises:
- a receptor base plate;
- a cylindrical impact receptacle mounted on the receptor base plate; and
- a replaceable impact plate and a rubber disc housed in the cylindrical impact receptacle.

13. The load cell assembly of claim 12 wherein at least the rubber disc is constructed to absorb shock and wherein the replaceable impact plate is constructed to fit within the cylindrical impact receptacle by a close tolerance fit.

14. The load cell assembly of claim 10 wherein the support carriage comprises:
- a front carriage plate;
- a rear carriage plate; and
- a plurality of guide rod assemblies for interconnecting the front carriage plate and the rear carriage plate.

15. A method for test firing a hammer and a hammer tool, comprising:
- providing a load cell assembly comprising a pneumatic air bag assembly constructed to dissipate the impact force delivered by the hammer tool and to expand to its original configuration after each test firing cycle of the hammer; and
- reciprocating the hammer into a test firing position with the hammer tool of the hammer impacting against the load cell assembly to absorb the impact force delivered by the hammer and to contract the pneumatic air bag assembly, and with the hammer moving away from the load cell assembly to allow the pneumatic air bag assembly to expand to its original configuration after each test firing cycle of the hammer.

16. The method of claim 15, further comprising:

supplying an amount of compressed air to the pneumatic air bag assembly to maintain a predetermined pressure in the pneumatic air bag.

17. The method of claim 16, further comprising:

providing a gauge regulator assembly for supplying and maintaining the compressed air in the air bag assembly at the predetermined pressure for receiving the impact force delivered by the hammer tool; and providing at least one pressure relief valve for maintaining the compressed air in the pneumatic air bag assembly at the predetermined pressure.

* * * * *